(12) United States Patent
Liang et al.

(10) Patent No.: US 10,827,454 B2
(45) Date of Patent: Nov. 3, 2020

(54) PAGING METHOD, DEVICE AND SYSTEM

(71) Applicant: CHINA ACADEMY OF TELECOMMUNICATIONS TECHNOLOGY, Beijing (CN)

(72) Inventors: Jing Liang, Beijing (CN); Fangli Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/090,168

(22) PCT Filed: Feb. 24, 2017

(86) PCT No.: PCT/CN2017/074732
§ 371 (c)(1),
(2) Date: Sep. 28, 2018

(87) PCT Pub. No.: WO2017/166963
PCT Pub. Date: Oct. 5, 2017

(65) Prior Publication Data
US 2019/0124620 A1    Apr. 25, 2019

(30) Foreign Application Priority Data
Mar. 31, 2016  (CN) .......................... 2016 1 0202192

(51) Int. Cl.
*H04W 68/00* (2009.01)
*H04W 76/27* (2018.01)
(Continued)

(52) U.S. Cl.
CPC .......... *H04W 68/00* (2013.01); *H04W 68/02* (2013.01); *H04W 76/19* (2018.02); *H04W 76/27* (2018.02); *H04W 84/042* (2013.01); *H04W 92/20* (2013.01)

(58) Field of Classification Search
CPC ... H04W 68/00; H04W 76/19; H04W 84/042; H04W 68/005; H04W 68/02;
(Continued)

(56) References Cited

U.S. PATENT DOCUMENTS 8,712,459 B2    4/2014  Lim et al.
8,849,319 B2 *  9/2014  Zhang ................... H04W 68/00
                                                    455/458
(Continued)

FOREIGN PATENT DOCUMENTS

CN    101674649 A    3/2010
CN    102378329 A    3/2012
(Continued)

OTHER PUBLICATIONS

Written Opinion of the International Search Authority for PCT/CN2017/074732 dated Apr. 21, 2017, and an English translation provided by WIPO.
(Continued)

*Primary Examiner* — Matthew C Sams
(74) *Attorney, Agent, or Firm* — Ladas & Parry, LLP

(57) ABSTRACT

Embodiments of the application provide a paging method, device and system. The method includes: when receiving downlink data of a User Equipment (UE) under Light Connection (LC) state, a first evolved Node B (eNB) generating a paging ID for the UE; the first eNB transmits a paging message within a paging area, according to the paging ID.

7 Claims, 7 Drawing Sheets

(51) Int. Cl.
*H04W 68/02* (2009.01)
*H04W 76/19* (2018.01)
*H04W 92/20* (2009.01)
*H04W 84/04* (2009.01)

(58) Field of Classification Search
CPC ..... H04W 60/04; H04W 68/04; H04W 68/08; H04W 56/001; H04W 76/27; H04W 60/06; H04W 92/20
See application file for complete search history.

(56) References Cited

U.S. PATENT DOCUMENTS

| | | | |
|---|---|---|---|
| 8,996,042 B1 | 3/2015 | Hannigan | |
| 9,560,628 B2 * | 1/2017 | Ostrup | H04W 68/04 |
| 2007/0286176 A1 * | 12/2007 | Flint | H04W 68/00 370/356 |
| 2008/0014969 A1 | 1/2008 | Laroia et al. | |
| 2010/0272004 A1 | 10/2010 | Maeda et al. | |
| 2013/0015953 A1 | 1/2013 | Hsu et al. | |
| 2013/0079041 A1 * | 3/2013 | Kunugi | H04W 68/00 455/458 |
| 2013/0208667 A1 * | 8/2013 | Merlin | H04W 68/02 370/329 |
| 2013/0260811 A1 * | 10/2013 | Rayavarapu | H04W 76/19 455/509 |
| 2014/0087731 A1 * | 3/2014 | Zhang | H04W 36/0055 455/436 |
| 2014/0140300 A1 | 5/2014 | Barrett | |
| 2015/0092554 A1 | 4/2015 | Mochizuki et al. | |
| 2015/0141062 A1 * | 5/2015 | Ostrup | H04W 68/04 455/458 |
| 2015/0173121 A1 | 6/2015 | Miklos et al. | |
| 2015/0195788 A1 | 7/2015 | Au et al. | |
| 2016/0119896 A1 * | 4/2016 | Jujaray | H04W 56/001 455/458 |
| 2016/0227481 A1 * | 8/2016 | Au | H04W 52/0209 |
| 2017/0078862 A1 * | 3/2017 | Artuso | H04W 68/04 |
| 2017/0367058 A1 * | 12/2017 | Pelletier | H04W 76/27 |
| 2019/0037531 A1 * | 1/2019 | Pantus | H04W 68/00 |

FOREIGN PATENT DOCUMENTS

| | | | | |
|---|---|---|---|---|
| CN | 102984660 A | 3/2013 | | |
| CN | 103067864 A | 4/2013 | | |
| CN | 103857038 A | 6/2014 | | |
| JP | 2009544244 A | 12/2009 | | |
| JP | 2014513499 A | 5/2014 | | |
| JP | 2014529390 A | 11/2014 | | |
| KR | 20150000808 A | 1/2015 | | |
| WO | WO-2013187814 A1 * | 12/2013 | ............ | H04W 68/08 |
| WO | 2014013057 A1 | 1/2014 | | |

OTHER PUBLICATIONS

International Search Report for PCT/CN2017/074732 dated May 15, 2017, and an English translation provided by WIPO.
Office Action from Taiwanese Application No. 106108273 dated Nov. 8, 2017.
Office Action from Taiwanese Application No. 106108273 dated Jun. 7, 2018.
First Office Action and search report from CN app. No. 201610202192.3, dated Dec. 27, 2018, with English translation from Global Dossier.
Extended European Search Report from EP app. No. 17772994.4, dated Mar. 7, 2019.
Notification of Reason for Refusal for KR app. No. 1020187030792, dated Mar. 12, 2019, with English translation from KIPO.
"Motivation for new WI on Light Connection in LTE", 3GPP TSG RAN Meeting #71, Goteborg, Sweden, Mar. 7-11, 2016.
"Solution: Mobility Framework", SA WG2 Meeting #S2-113ah, Feb. 23-26, 2016, Sophia Antipolis, FR.
Notice of Reasons for Refusal from JP app. No. 2018-551322, dated Jul. 23, 2019, with English translation from Global Dossier.
"Preliminary Views and Initial Considerations on 5G RAN Architecture and Functional Design", 5G PPP METIS II White Paper, Mar. 8, 2016.
"$3^{rd}$ Generation Partnership Project; Technical Specification Group Services and System Aspects; Study on architecture enhancements for Cellular Internet of Things", 3GPP TR 23.70 V13.0.0, Mar. 2016.
Notification of Reason for Refusal from KR app. No. 2019-7036224, dated Feb. 7, 2020, with English translation provided by Espacenet.

* cited by examiner

US 10,827,454 B2

PAGING METHOD, DEVICE AND SYSTEM

CROSS-REFERENCE TO RELATED APPLICATIONS

The application is the U.S. national phase of PCT Application No. PCT/CN2017/074732 filed on Feb. 24, 2017, which claims priority to Chinese Patent Application No. 201610202192.3, filed with the Chinese Patent Office on Mar. 31, 2016, the entire disclosures of which are incorporated herein by reference in their entireties.

TECHNICAL FIELD

The application relates to communications technologies, and more particularly, to a paging method, device and system.

BACKGROUND

Current Paging Discontinuous Reception (DRX) mechanism: from a wireless network side, in a Long Term Evolution (LTE) system, a User Equipment (UE) possesses two states, that is, a Radio Resource Control (RRC) connected state and a RRC-idle state. A UE may be capable of transmitting uplink data, only after entering the RRC_connected state. When data transmission of the UE is completed, after monitoring that no data transmission is initiated by the UE within a long time period, a network enables the UE to enter the RRC_idle state by using an RRC connection release through the RRC connection of the UE.

The main work of a UE under an idle state is to monitor paging from a network side. The DRX mode is adopted to monitor the paging, in order to save electricity. That is, within each paging period, there is only one subframe (10 ms) under receiving state. And the remaining time within the period is under non-receiving state, as shown in FIG. 1.

For a paging process, a Core Network (CN) is in charge of initiating the paging. A paging message is firstly transmitted from a Mobility Management Entity (MME) to an evolved Node B (eNB), as shown in FIG. 2. The paging message carries a UE specific DRX configuration. For an LTE system, the eNB may compare the DRX configuration with a DRX parameter configured by a system message, and adopt a shorter DRX period to transmit the paging message. The paging message transmitted by the eNB carries the ID of the UE to be paged. After receiving the paging message, the UE learns that the paging ID thereof is included in the paging message, subsequently responds to the paging, and enters the connection state after initiating a connection establishment process.

The network may adopt a large amount of signaling, in order to perform a mobility management on the UE, as well as receive data from and transmit data to the UE. In order to save the signaling overheads of an air interface, a new RRC state is introduced into LTE R14, which is referred to as Light Connection (LC) state. A schematic diagram illustrating state conversion is shown in FIG. 3. When a UE is in the Light Connection state, the MME still considers that the UE is in the connected state, while the eNB considers that the UE is in the RRC-Light-Connection state capable of monitoring paging, but cannot receive or transmit data.

In the related technologies, the UE only has two states of connection and idle. The paging mechanism is designed for a UE under the idle state, which is not applicable to a UE under light connection state. That is, when downlink data arrives, there is no solution about how to perform a paging on a UE under the light connection state by an eNB.

SUMMARY

In view of foregoing technical problems, the application provides a paging method, device and system, so as to enable an evolved Node B (eNB) to transmit a paging message to a User Equipment (UE) under a Light Connection (LC) state when downlink data arrives.

According to one aspect of embodiments of the application, a paging method is provided, and the method includes: generating, by a first eNB, a paging ID of a UE, when receiving downlink data of the UE under an LC state; and, transmitting, by the first eNB, a paging message within a paging area, according to the paging ID.

Optionally, the method further includes:

before receiving the downlink data of the UE under the LC state, configuring, by the first eNB, the UE to enter the LC state from a connection state, by using dedicated signaling; and, maintaining, by the first eNB, a S1 connection of the UE under the LC state.

Optionally, the transmitting by the first eNB the paging message within the paging area according to the paging ID includes:

taking, by the first eNB, System Architecture Evolution (SAE)-Temporary Mobile Subscriber Identity (S-TMSI) of the UE as the paging ID of the UE, and transmitting the paging message to the UE within the paging area via an air interface; or, taking, by the first eNB, a connection recovery ID of the UE as the paging ID of the UE, and transmitting the paging message to the UE within the paging area via the air interface, wherein the connection recovery ID is generated by the first eNB; or, transmitting, by the first eNB, the paging ID to multiple second eNBs within the paging area, wherein the multiple second eNBs of the paging area respectively transmit the paging message within a cell under coverage.

Optionally, the method further includes:

after transmitting the paging message within the paging area, establishing, by the first eNB, a Radio Resource Control (RRC) connection to the UE, discarding a paging related Non-Access-Stratum (NAS) message carried by a connection establishment process; and, transmitting, by the first eNB, the downlink data to the UE under the connection state.

Optionally, the method further includes:

broadcasting, by the first eNB, paging parameters of the UE under the LC state.

According to another aspect of embodiments of the application, a paging method is provided, including: receiving, by a second eNB, from a first eNB a paging message, which is for use in paging a UE under an LC State, wherein the paging message is transmitted by the first eNB within a paging area, when the first eNB receives downlink data of the UE under the LC state; and, transmitting, by the second eNB, the paging message within a cell under coverage.

Optionally, the method further includes:

establishing, by the second eNB, a Radio Resource Control (RRC) connection to the UE, discarding a paging related Non-Access-Stratum (NAS) message carried by a connection establishment process; and, informing, by the second eNB, the first eNB a message that a connection has been established with the UE.

Optionally, the method further includes:

receiving, by the second eNB, the downlink data from the first eNB; and, transmitting, by the second eNB, the downlink data to the UE.

Optionally, the method further includes:

broadcasting, by the second eNB, paging parameters of the UE under the LC state, by using system information.

According to still another aspect of embodiments of the application, a paging method is provided, which includes:

monitoring, by a UE under an LC state, a paging message;

when monitoring the paging message, initiating, by the UE under the LC state, a connection establishment process, and entering a connection state from the LC state.

Optionally, the method further includes:

receiving system information, wherein the system information carries paging parameters of the UE under the LC state;

wherein monitoring by the UE under the LC state the paging message includes:

calculating, by the UE under the LC state, a paging position, and monitoring the paging message, according to configured paging parameters and the identity (ID) of the UE.

According to another aspect of embodiments of the application, an eNB is provided, including a paging ID generating module and a first paging message transmitting module, wherein the paging ID generating module is adapted to generate a paging ID for a UE, when receiving downlink data of the UE under an LC state; and, the first paging message transmitting module is adapted to transmit a paging message within a paging area, according to the paging ID.

Optionally, the eNB further includes a configuring module and a connection maintaining module, wherein the configuring module is adapted to configure the UE under a connection state to enter the LC state, by using dedicated signaling; and, the connection maintaining module is adapted to maintain a S1 connection of the UE under the LC state.

Optionally, the paging message transmitting module is further adapted to:

take S-TMSI of the UE as the paging ID of the UE, and transmitting the paging message to the UE within the paging area via an air interface; or, take a connection recovery ID of the UE as the paging ID of the UE, and transmitting the paging message to the UE within the paging area via the air interface, wherein the connection recovery ID is generated by the eNB; or, transmit the paging ID to multiple second eNBs within the paging area, wherein the multiple second eNB of the paging area respectively transmit the paging message in a cell under coverage.

Optionally, the eNB further includes a second connection establishing module and a first data transmitting module, wherein the second connection establishing module is adapted to establish an RRC connection with the UE, and discard a paging related NAS message carried by a connection establishment process; and, the first data transmitting module is adapted to transmit the downlink data to the UE under the connection state.

Optionally, the eNB further includes a first broadcasting module, wherein the first broadcasting module is adapted to broadcast paging parameters of the UE under the LC state, by using system information.

According to another aspect of embodiments of the application, an eNB is provided, including a paging message receiving module and a second paging message transmitting module, wherein the paging message receiving module is adapted to receive from a first eNB a paging message of a UE under an LC state, wherein the paging message is transmitted by the first eNB within a paging area, when receiving downlink data of the UE under the LC state; and, the second paging message transmitting module is adapted to transmit the paging message within a cell under coverage.

Optionally, the eNB further includes a second connection establishing module and an informing module, wherein the second connection establishing module is adapted to establish an RRC to the UE, and discard a paging related NAS message carried by a connection establishment process; and, the informing module is adapted to inform the first eNB a message that a connection has been established with the UE.

Optionally, the eNB further includes a downlink data receiving module and a second data transmitting module, wherein the downlink data receiving module is adapted to receive the downlink data from the first eNB; and, the second data transmitting module is adapted to transmit the downlink data to the UE.

Optionally, the eNB further includes a second broadcasting module, wherein the second broadcasting module is adapted to broadcast paging parameters of the UE under the LC state, by using system information.

According to still another aspect of embodiments of the application, a UE is provided, including a monitoring module and an initiated-connection establishing module, wherein the monitoring module is adapted to monitor a paging message under an LC state; and, the initiated-connection establishing module is adapted to initiate a connection establishment process, and enter a connection state from the LC state, when receiving the paging message.

Optionally, the UE further includes a system information receiving module, wherein the system information receiving module is adapted to receive system information, wherein the system information carries paging parameters of the UE under the LC state; and, the monitoring module is further adapted to calculate a paging position, and monitor the paging message, according to the paging parameters configured, when the UE is under the LC state.

According to another aspect of embodiments of the application, a paging system is provided, including a first eNB and a UE, wherein the first eNB is adapted to generate a paging ID for the UE, when receiving downlink data of the UE under an LC state; the first eNB is further adapted to transmit a paging message within a paging area, according to the paging ID; the UE is adapted to monitor the paging message, when the UE is under the LC state; and, the UE is further adapted to initiate a connection establishment process, and enter a connection state from the LC state, when receiving the paging message under the LC state.

According to still another aspect of embodiments of the application, a paging system is provided, including a first eNB, a second eNB and a UE, wherein the first eNB is adapted to generate a paging ID, when receiving downlink data of the UE under an LC state; the first eNB is further adapted to transmit a paging message within a paging area, according to the paging ID; the second eNB is adapted to receive from the first eNB the paging message, which is for use in paging the UE under the LC state; the second eNB is further adapted to transmit the paging message within a cell under coverage; the UE is adapted to monitor the paging message under the LC state; and, the UE is further adapted to initiate a connection establishment process, and enter a connection state from the LC state, when receiving the paging message under the LC state.

The following advantages or beneficial effects may be achieved by one technical solution of foregoing technologies. Paging problems of a UE under the LC state may be solved, thereby reducing signaling overheads of the whole system, meanwhile guaranteeing system performance.

DETAILED DESCRIPTION

Exemplary embodiments of the application will be described in detail, accompanying with attached figures.

Although the exemplary embodiments of the application are displayed by the attached figures, it should be understood that, the application may be implemented in various forms, instead of being limited by the embodiment described here. On the contrary, the objective for providing these embodiments is to enable persons having ordinary skill in the art to understand the application more deeply, and completely convey the scope of the application to those skilled in the art.

Figure 1:
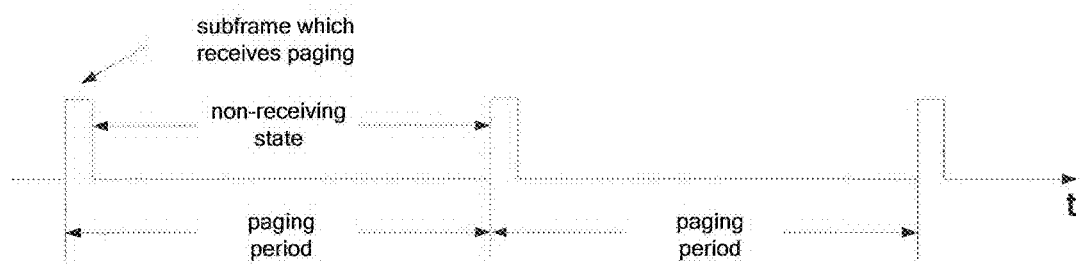
FIG. 1 is a schematic diagram illustrating how to monitor a paging by a UE under idle state in the related technologies.
Figure 2:
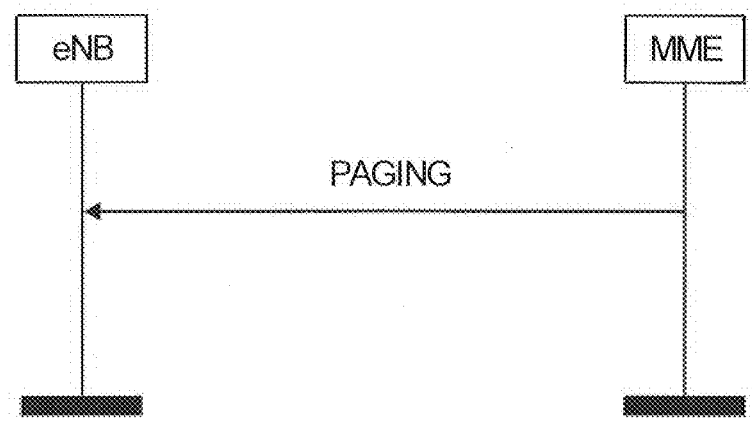
FIG. 2 is a schematic diagram illustrating a paging message of S1 interface in a LTE system in the related technologies.
Figure 3:
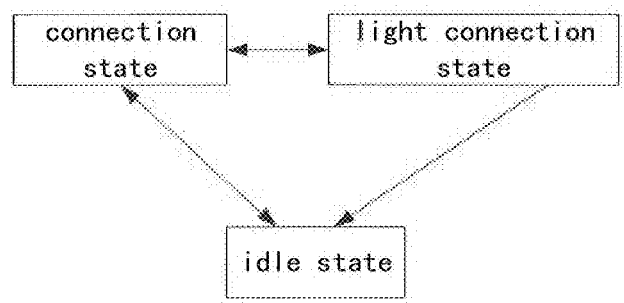
FIG. 3 is a schematic diagram illustrating state conversion in the related technologies.
Figure 4:
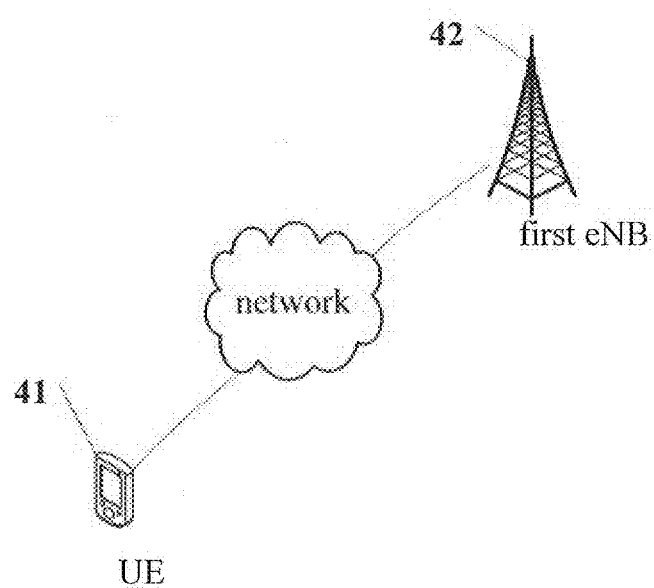
FIG. 4 is a schematic diagram illustrating a network structure, in accordance with an embodiment of the application.
Figure 5:
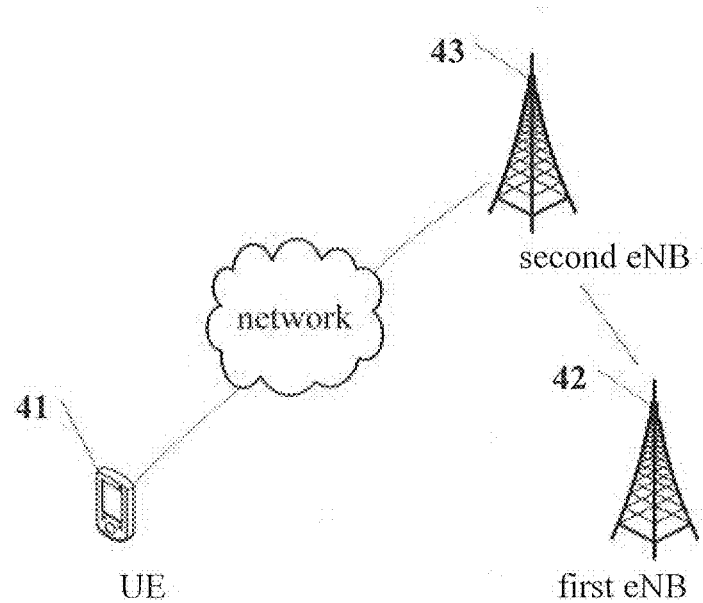
FIG. 5 is a schematic diagram illustrating a network structure, in accordance with an embodiment of the application.

With reference to FIG. 4 and FIG. 5, FIG. 4 and FIG. 5 respectively illustrates a structure of a network, in accordance with an embodiment of the application. As shown in FIG. 4, a network structure may include a UE 41 and a first eNB 42. The first eNB receives downlink data from the UE 41, which is under the LC state. As shown in FIG. 5, the network structure may include a UE 41, a first eNB 42, and a second eNB 43. The second eNB 43 is located within a paging area of the first eNB 42. The first eNB 42 receives downlink data from the UE 41, which is under the LC state. The UE 41 refers to a device, which is capable of transmitting or receiving a wireless signal, including a user equipment (UE), a Personal Digital Assistant (PDA), a wireless modem, a wireless communication device, a handheld device, a laptop, a radiophone, a wireless local loop (WLL) station, a Customer Premise Equipment capable of converting a mobile signal to a WiFi signal, or a mobile intelligence hot spot, or another device, which may initiatively communicate with mobile communication network without a human operation, and so on. The first eNB 42 and the second eNB 43 may be a Macro Base Station, a Pico Base Station, a Node B (name of 3G mobile base station), an enhanced base station (ENB), a relay station, a access point, a Remote Radio Unit (RRU), a Remote Radio Head (RRH), and so on.

A First Embodiment

Figure 6:
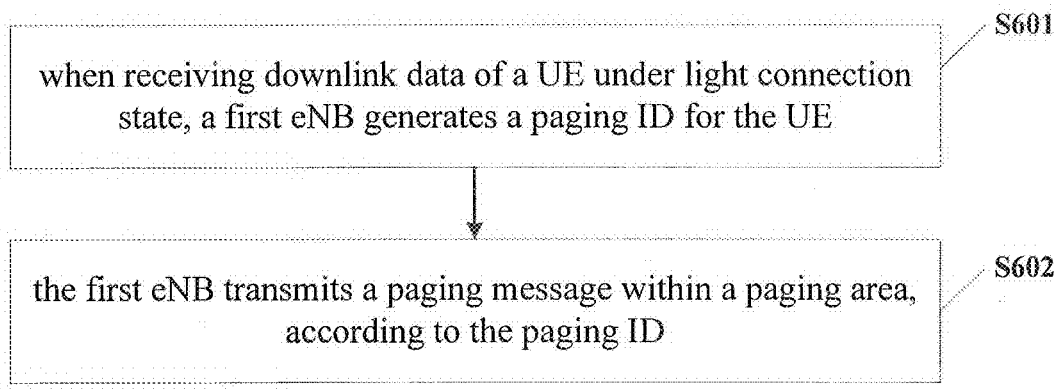
FIG. 6 is a paging flowchart, in accordance with a first embodiment of the application.

Taking into account the network structures shown in FIG. 4 and FIG. 5, with reference to FIG. 6, FIG. 6 illustrates a paging method, which includes the following blocks.

Block S601, when receiving downlink data from a UE under an LC state, a first eNB generates a paging ID for the UE.

In block S602, the first eNB transmits a paging message within a paging area, according to the paging ID.

Optionally, the first eNB takes the System Architecture Evolution (SAE)-Temporary Mobile Subscriber Identity (S-TMSI) of the UE as the paging ID of the UE, and transmits the paging message to the UE within the paging area via an air interface. Alternatively, the first eNB takes a connection recovery ID of the UE as the paging ID of the UE, and transmits the paging message to the UE within the paging area via the air interface. The connection recovery ID is generated by the first eNB. Alternatively, the first eNB transmits the paging ID to multiple second eNBs within the paging area. The multiple second eNBs of the paging area respectively transmit the paging message within a cell under coverage.

Optionally, before foregoing S601, the method further includes: the first eNB configures the UE under connection state to enter LC state, by using dedicated signaling. The first eNB maintains S1 connection of the UE, which has entered the LC state.

Optionally, after transmitting the paging message within the paging area, the method further includes: the first eNB establishes an RRC connection to the UE, discards paging related Non-access stratum (NAS) messages, which are carried during the connection establishment process. The first eNB transmits downlink data to the UE under the connection state.

Optionally, the method further includes: the first eNB broadcasts paging parameters of the UE under the LC state, by using system information.

In the embodiment, paging problems of UEs under light connection state may be solved, thereby reducing signaling overheads of the whole system, meanwhile ensuring system performance.

A Second Embodiment

Figure 7:
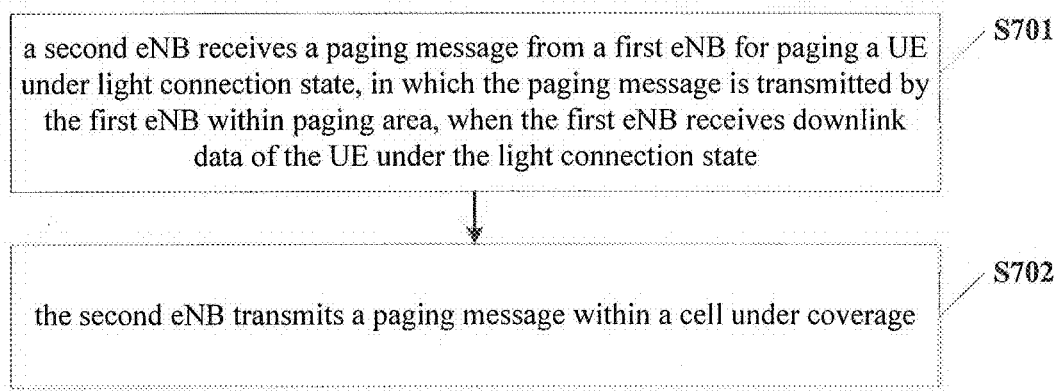
FIG. 7 is a paging flowchart, in accordance with a second embodiment of the application.

Taking into account the network structure shown in FIG. 5, with reference to FIG. 7, FIG. 7 illustrates a flowchart of a paging method, which includes the following blocks.

In block S701, a second eNB receives from a first eNB a paging message, which is for use in paging a UE under an LC state, in which the paging message is transmitted by the first eNB within a paging area, when the first eNB receives downlink data from the UE under the LC state.

In block S702, the second eNB transmits the paging message within a cell under coverage.

Optionally, in the embodiment, the method further includes: the second eNB establishes an RRC connection to the UE, discards paging related NAS messages, which are carried by the connection establishment process. And the second eNB informs the first eNB that the second eNB has established a connection with the UE.

Optionally, in the embodiment, the method further includes: the second eNB receives the downlink data from the first eNB, and transmits the downlink data to the UE.

Optionally, in the embodiment, the method further includes: the second eNB broadcasts paging parameters of the UE under the LC state, by using system information.

In the embodiment, paging problems of a UE under light connection state may be solved, thereby reducing signaling overheads of the whole system, meanwhile guaranteeing system performance.

A Third Embodiment

Figure 8:
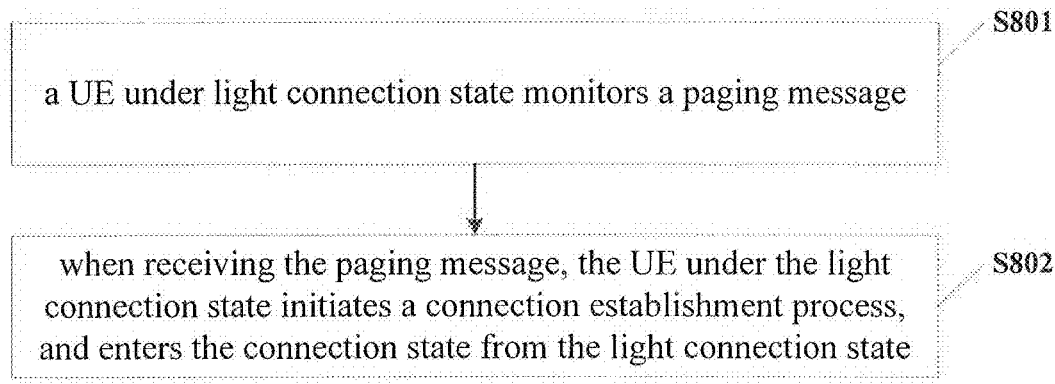
FIG. 8 is a paging flowchart, in accordance with a third embodiment of the application.

Taking into account the network structure shown in FIG. 4 or FIG. 5, with reference to FIG. 8, FIG. 8 illustrates a flowchart for a paging method, which includes the following blocks.

In block S801, a UE under an LC state monitors a paging message.

It should be noted that, the paging message monitored by the UE may be transmitted by a first eNB, or a second eNB.

In block S802, when receiving the paging message, the UE under the LC state initiates a connection establishment process, and enters a connection state from the LC state.

Optionally, the method further includes: receiving system information, in which the system information carries paging parameters of the UE under the LC state. Correspondingly, in block S801, the UE under the LC state calculates a paging position, and monitoring the paging message, according to configured paging parameters and UE ID (e.g., IMSI).

In the embodiment, paging problems of a UE under light connection state may be solved, thereby reducing signaling overheads of the whole system, meanwhile guaranteeing system performance.

A Fourth Embodiment

Figure 9:
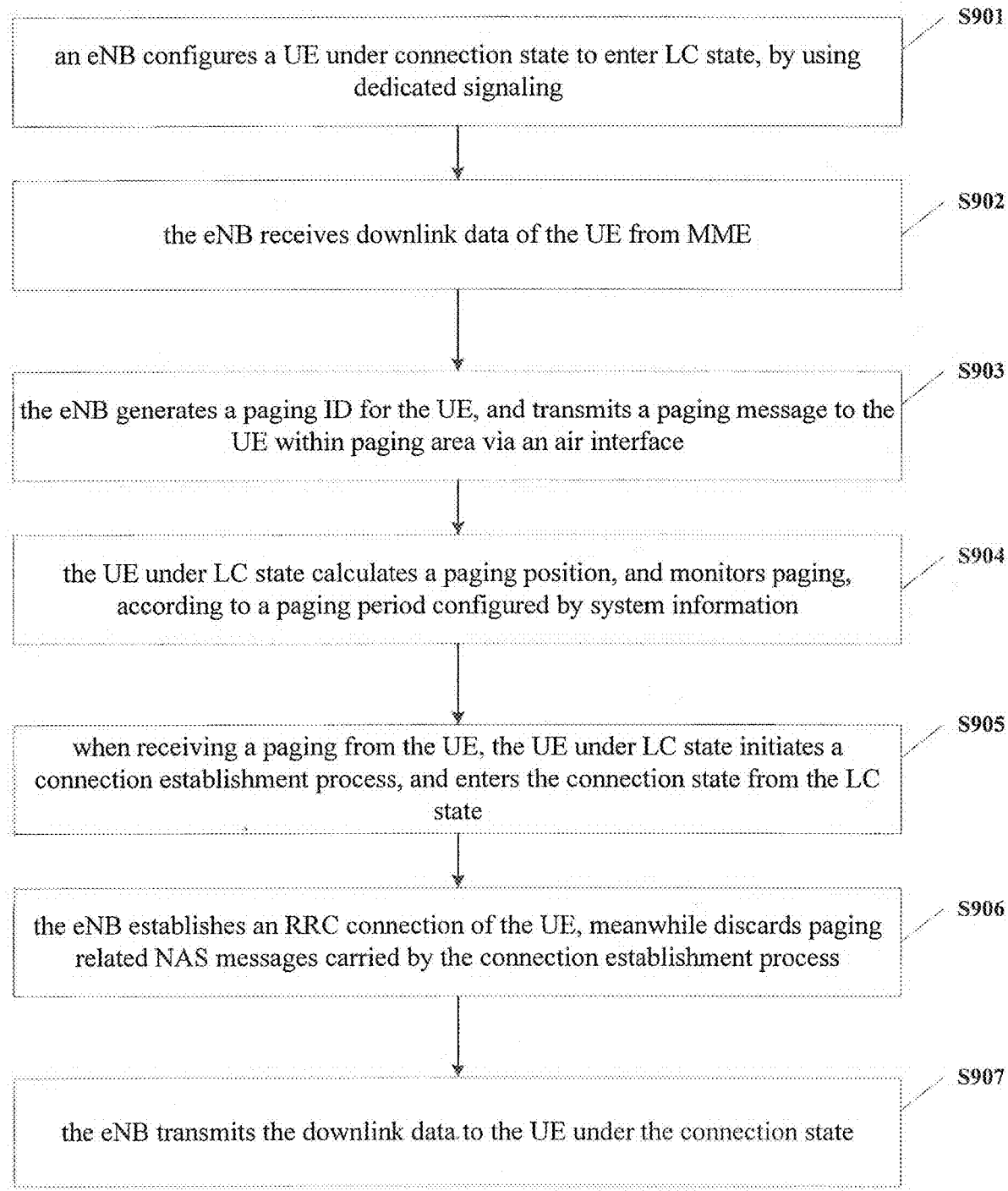
FIG. 9 is a paging flowchart, in accordance with a fourth embodiment of the application.

Taking into account the network structure shown in FIG. 4 or FIG. 5, with reference to FIG. 9, FIG. 9 illustrates a flowchart of a paging method, which includes the following blocks.

In block S901, an eNB configures a UE under connection state to enter LC state, by using dedicated signaling.

It should be noted that, the eNB simultaneously maintains S1 connection of the UE. At this time, a MME still considers that the UE is under the connection state.

In block S902, the eNB receives downlink data of the UE from the MME.

In block S903, the eNB generates a paging ID for the UE, and transmits a paging message to the UE within a paging area via an air interface.

It should be noted that, the paging area may include one or more eNBs. The eNB, which receives the downlink data, transmits the paging ID to each eNB (via X2, S1 or another inter-eNB interface) within the paging area. Each eNB of the whole paging area transmits the paging message within a cell under coverage.

It should be noted that, the eNB may take S-TMSI of the UE as the paging ID, or may generate a paging ID by itself. The specific form of the paging ID is not limited in the embodiment.

In block S904, the UE under the LC state calculates a paging position, and monitors paging, according to a paging period configured by the system information.

In block S905, when receiving the paging of the UE under the LC state, the UE under the LC state initiates a connection establishment process, and enters connection state from the LC state.

In block S906, the eNB establishes an RRC connection of the UE, meanwhile discards paging related NAS messages, which are carried by the connection establishment process.

It should be noted that, a first eNB, which establishes the RRC connection, informs a second eNB (that is the eNB generates the paging ID), which receives the downlink data, a message that the UE has entered the connection state. The second eNB transmits the downlink data of the UE to the first eNB (via X2 or another inter-eNB interface).

In block S907, the eNB transmits the downlink data to the UE under connection state.

In the embodiment, paging problems of a UE under light connection state may be solved, thereby reducing signaling overheads of the whole system, meanwhile guaranteeing system performance.

A Fifth Embodiment

In the embodiment, paging ID of a UE is S-TMSI.

Specifically, an eNB broadcasts paging parameters of the UE under the LC state, by using system information. The paging parameters include a paging period, a paging density, and so on. The UE initiates a connection establishment process. When the UE enters connection state, the eNB obtains and always stores the S-TMSI of the UE. Subsequently, the eNB configures the UE under connection state to enter LC state, by using dedicated signaling, meanwhile maintains S1 connection of the UE. At this time, MME still considers that the UE is under connection state. The UE under the LC state calculates a paging position (by using a calculation mode in the related technologies), and monitors paging, according to paging period and paging density configured by system information and IMSI of the UE. Subsequently, downlink data of the UE arrives, and the MME directly transmits the downlink data to the eNB. The eNB takes the S-TMSI as the paging ID of the UE, and transmits a paging message to the UE via an air interface.

When receiving a paging from the UE under the LC state, the UE under the LC state initiates a connection establishment process, and enters connection state from LC state. The eNB establishes an RRC connection of the UE, meanwhile discards paging related NAS messages, which are carried by the connection establishment process. Subsequently, the eNB transmits the downlink data to the UE under connection state.

A Sixth Embodiment

In the embodiment, an eNB generates a paging ID for a UE.

Specifically, the eNB broadcasts paging parameters of the UE under the LC state, by using system information. The paging parameters include a paging period, a paging density, and so on. The UE initiates a connection establishment process, and enters connection state, so as to receive and transmit data. Subsequently, the eNB randomly generates a connection recovery ID of 40 bits for the UE. When configuring the UE under connection state to enter LC state, by using dedicated signaling, the eNB configures the connection recovery ID for the UE. Meanwhile, the eNB maintains S1 connection of the UE. At this time, a MME still considers that the UE is under connection state. The UE under the LC state calculates a paging position (e.g., by using a calculation mode in the related technologies), and monitors paging, according to paging period and paging density configured by system information and IMSI of the UE. Subsequently, downlink data of the UE arrives. The MME directly transmits the downlink data to the eNB. The eNB takes the connection recovery ID of the UE as the paging ID of the UE, and transmits a paging message to the UE via an air interface.

After receiving a paging from the UE under the LC state, the UE under the LC state initiates a connection establishment process, and enters LC state from connection state. The eNB establishes an RRC connection of the UE, meanwhile discards paging related NAS messages, which are carried by the connection establishment process. Subsequently, the eNB transmits the downlink data to the UE under connection state.

A Seventh Embodiment

Figure 10:
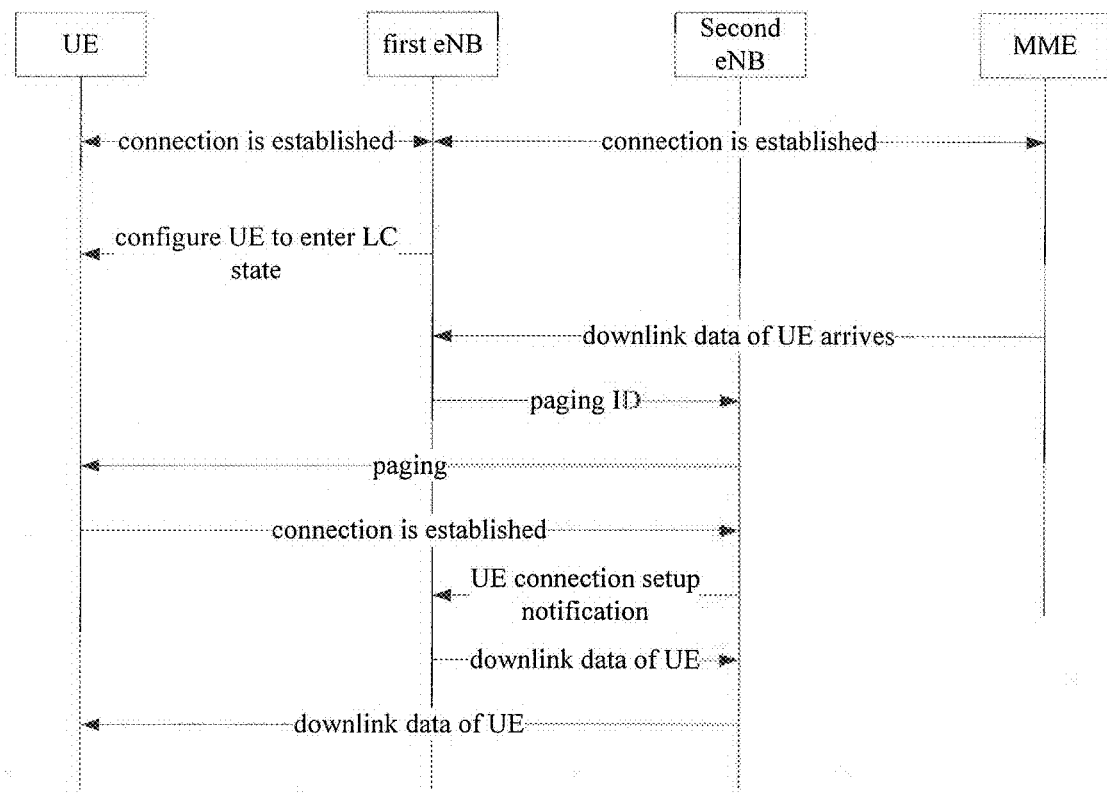
FIG. 10 is a schematic diagram illustrating transmission of inter-eNB paging and downlink data, in accordance with a seventh embodiment of the application.

In the embodiment, what is transmitted is inter-eNB paging and downlink data, as shown in FIG. 10.

Specifically, an eNB within a LC paging area broadcasts paging parameters of a UE under an LC state, by using system information. The paging parameters include a paging period, a paging density, and so on. When an eNB1 initiates a connection establishment process, the UE enters the connection state to receive and transmit data. Subsequently, the eNB1 generates a paging ID for the UE. When configuring the UE under connection state to enter LC state, by using dedicated signaling, the eNB1 configures the paging ID for the UE, meanwhile maintains S1 connection of the UE. At this time, a MME still considers that the UE is under connection state. The UE under the LC state calculates a paging position (by using a calculation mode in related technologies), and monitors paging, according to paging period and paging density configured by system information and IMSI of the UE.

Subsequently, downlink data of the UE arrives. The MME directly transmits the downlink data to the eNB1. The eNB1 transmits the paging ID of the UE to each eNB within a paging area (via X1, S1 or another inter-eNB interface). Each eNB of the whole paging area (e.g., an eNB2 and an eNB3) transmits the paging message of the UE within a cell under coverage.

When the UE under the LC state has already entered a coverage scope of the eNB2, after receiving a paging from the UE itself under the coverage of the eNB2, the UE under the LC state initiates a connection establishment process, and enters the connection state from the LC state. The eNB2 establishes an RRC connection of the UE, meanwhile discards paging related NAS messages carried by the connection establishment process. Subsequently, the eNB2 informs the eNB1 a message that the UE has already entered the connection state. The eNB1 transmits the downlink data of the UE to the eNB2 (via X2 or another inter-eNB interface). Subsequently, the eNB2 transmits that the downlink data to the UE under the connection state.

An Eighth Embodiment

Figure 11:
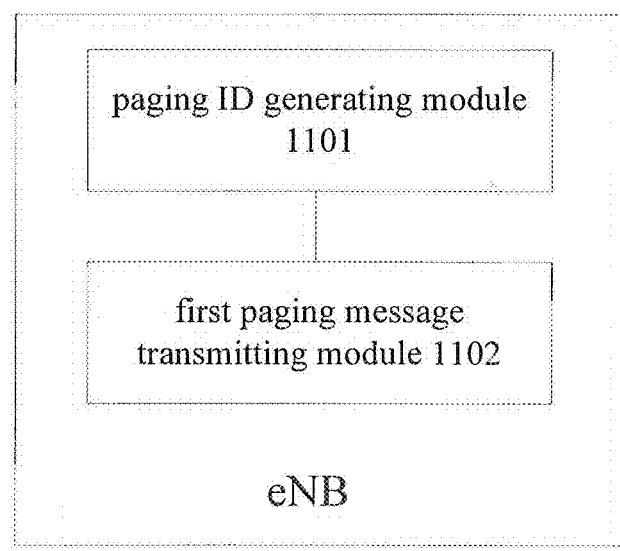
FIG. 11 is a schematic diagram illustrating a structure of an eNB, in accordance with an eighth embodiment of the application.

With reference to FIG. 11, FIG. 11 illustrates an eNB, which includes a paging ID generating module 1101 and a first paging message transmitting module 1102.

The paging ID generating module 1101 is adapted to generate a paging ID for a UE, when receiving downlink data of the UE under the LC state.

The first paging message transmitting module 1102 is adapted to transmit a paging message within a paging area, according to the paging ID.

Optionally, the eNB further includes a configuring module and a connection maintaining module.

The configuring module is adapted to configure the UE under connection state to enter LC state, by using dedicated signaling.

The connection maintaining module is adapted to maintain S1 connection of the UE under the LC state.

Optionally, the first paging message transmitting module is further adapted to take S-TMSI of the UE as the paging ID of the UE, and transmits the paging message to the UE within a paging area via an air interface; or, takes a connection recovery ID of the UE as the paging ID of the UE, and transmits the paging message to the UE within the paging area via an air interface. The connection recovery ID is generated by a first eNB. Alternatively, the paging ID is transmitted to multiple second eNBs within the paging area. The multiple second eNBs of the paging area respectively transmit the paging message within a cell under coverage.

Optionally, the eNB further includes a second connection establishing module, which is adapted to establish an RRC connection of the UE, and discard paging related NAS messages carried by the connection establishment process. The first data transmitting module is adapted to transmit the downlink data to the UE under connection state.

Optionally, the eNB further includes a first broadcasting module, which is adapted to broadcast paging parameters of the UE under the LC state, by using system information.

In the embodiment, paging problems of a UE under the LC state may be solved, thereby reducing signaling overheads of the whole system, and guaranteeing system performance.

A Ninth Embodiment

Figure 12:
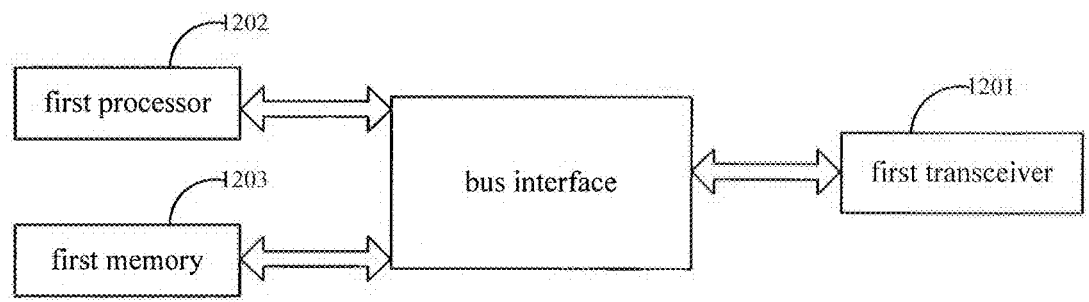
FIG. 12 is a schematic diagram illustrating a structure of an eNB, in accordance with a ninth embodiment of the application.

With reference to FIG. 12, FIG. 12 illustrates an eNB, which includes a first processor 1202 and a first transceiver 1201.

The first processor 1202 is adapted to generate a paging ID for a UE, when receiving downlink data of the UE under the LC state.

The first transceiver 1201 is adapted to transmit the paging ID within a paging area, according to the paging ID.

Optionally, the first processor 1202 is further adapted to configure the UE under connection state to enter LC state, by using dedicated signaling, and maintain S1 connection of the UE under the LC state.

Optionally, the first transceiver 1201 is further adapted to take S-TMSI of the UE as the paging ID of the UE, and transmit a paging message to the UE within a paging area via an air interface; or take a connection recovery ID of the UE as the paging ID of the UE, and transmit the paging message to the UE within the paging area via an air interface. The connection recovery ID is generated by a first eNB. Alternatively, the paging ID is transmitted to multiple second eNBs within the paging area. The multiple second eNBs of the paging area respectively transmit the paging message in a cell under coverage.

Optionally, the first transceiver 1201 is further adapted to establish an RRC connection to the UE, discard paging related NAS messages carried by the connection establishment process, and transmit the downlink data to the UE under connection state.

Optionally, the first transceiver 1201 is further adapted to broadcast paging parameters of the UE under the LC state, by using system information.

In the embodiment, paging problems of a UE under the LC state may be solved, thereby reducing signaling overheads of the whole system, meanwhile guaranteeing system performance.

In FIG. 12, a bus structure may include any number of interconnected buses and bridges. Specifically, at least one processor demonstrated by the first processor 1202 is connected with various circuits of a memory, which is demonstrated by the first memory 1203. The bus structure may further connect various other circuits, such as, peripheral equipment, voltage regulator and power management circuit, which are common to persons having ordinary skill in the art. Thus, no further description is provided here. The bus interface provides an interface. The first transceiver 1201 may be multiple components, that is, include a transmitter and a receiver, which provides a unit to communicate with various other devices via a transmission medium.

A Tenth Embodiment

Figure 13:
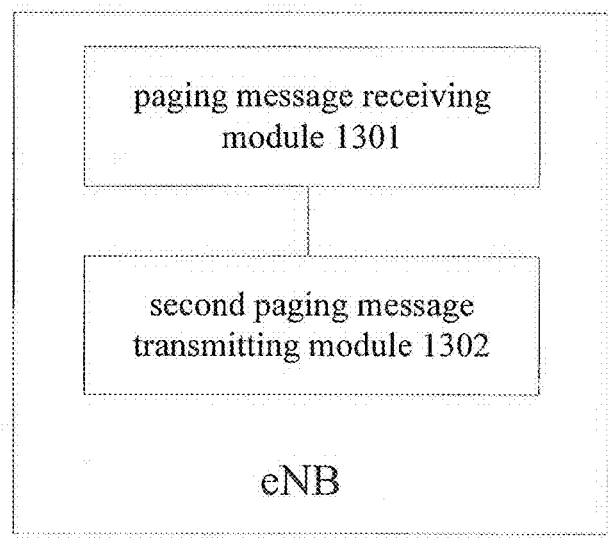
FIG. 13 is a schematic diagram illustrating a structure of an eNB, in accordance with a tenth embodiment of the application.

With reference to FIG. 13, FIG. 13 illustrates a structure of an eNB, including a paging message receiving module 1301 and a second paging message transmitting module 1302.

The paging message receiving module 1301 is adapted to receive from a first eNB a paging message, which is for use in paging a UE under the LC state. The paging message is transmitted by the first eNB within a paging area, when receiving downlink data of the UE under the LC state.

The second paging message transmitting module 1302 is adapted to transmit the paging message in a cell under coverage.

Optionally, the eNB further includes a second connection establishing module and an informing module.

The second connection establishing module is adapted to establish an RRC connection to the UE, and discard paging related NAS messages carried by the connection establishment process.

The informing module is adapted to inform the first eNB that a connection has been established with the UE.

Optionally, the eNB further includes a downlink data receiving module and a second data transmitting module.

The downlink data receiving module is adapted to receive downlink data from the first eNB.

The second data transmitting module is adapted to transmit the downlink data to the UE.

Optionally, the eNB further includes a second broadcasting module.

The second broadcasting module is adapted to broadcast paging parameters of the UE under the LC state, by using system information.

In the embodiment, paging problems of a UE under the LC state may be solved, thereby reducing signaling overheads of the whole system, meanwhile guaranteeing system performance.

An Eleventh Embodiment

Figure 14:
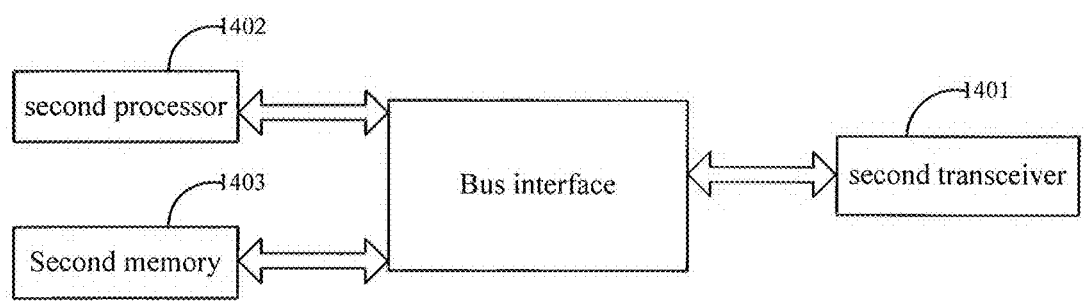
FIG. 14 is a schematic diagram illustrating a structure of an eNB, in accordance with a eleventh embodiment of the application.

With reference to FIG. 14, FIG. 14 illustrates an eNB, which includes a second processor 1402.

The second processor 1402 is adapted to control a second transceiver 1401 to receive from a first eNB a paging message, which is for use in paging a UE under an LC state. The paging message is transmitted by the first eNB within a paging area, when the first eNB receives downlink data of the UE under the LC state. The paging message is also transmitted by the first eNB within a cell under coverage.

Optionally, the second transceiver 1401 is further adapted to establish an RRC connection with the UE, discard paging related NAS messages carried by the connection establishment process, and inform the first eNB that a connection has been established with the UE.

Optionally, the second transceiver 1401 is further adapted to broadcast paging parameters of the UE under the LC state, by using system information.

In FIG. 14, the bus structure may include any number of interconnected buses and bridges. Specifically, at least one processor demonstrated by the second processor 1402 is connected with various circuits of a memory, which is demonstrated by the second memory 1403. The bus structure may also connect various other circuits, such as peripheral equipment, voltage regulator and power management circuit, which are common to those skilled in the art. A bus interface provides an interface. The second transceiver 1401 may be multiple components, that is, include a transmitter and a receiver, which provides a unit to communicate with various other devices via a transmission medium.

In the embodiment, paging problems of a UE under an LC state may be solved, thereby reducing signaling overheads of the whole system, meanwhile guaranteeing system performance.

A Twelfth Embodiment

Figure 15:
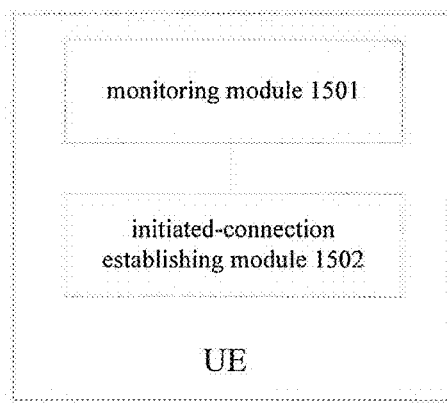
FIG. 15 is a schematic diagram illustrating a structure of a UE, in accordance with a twelfth embodiment of the application.

With reference to FIG. 15, FIG. 15 illustrates a structure of a UE, which includes a monitoring module 1501, and an initiated-connection establishing module 1502.

The monitoring module 1501 is configured to monitor a paging message under the LC state.

The initiated-connection establishing module 1502 is adapted to initiate a connection establishment process, and enter connection state from LC state, when receiving the paging message.

Optionally, the UE further includes a system information receiving module.

The system information receiving module is adapted to receive system information, in which the system information carries paging parameters of a UE under an LC state.

The monitoring module is further configured to calculate a paging position, and monitor the paging message, according to configured paging parameters under the LC state.

In the embodiment, paging problems of a UE under an LC state may be solved, thereby reducing signaling overheads of the whole system, meanwhile guaranteeing system performance.

A Thirteenth Embodiment

Figure 16:
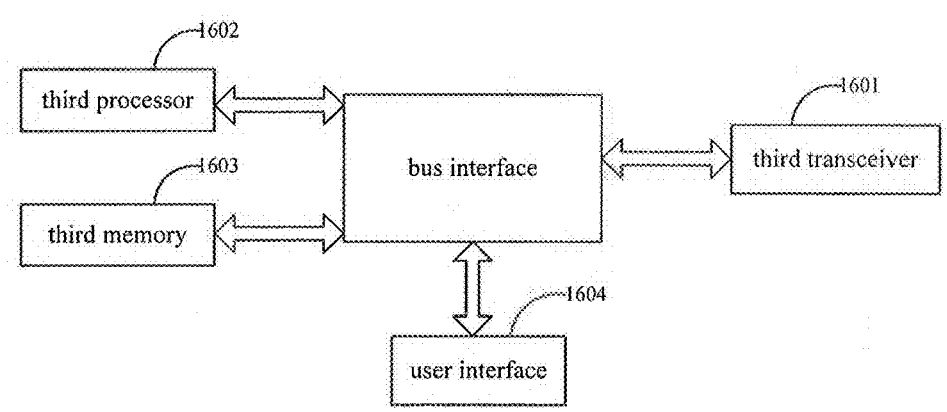
FIG. 16 is a schematic diagram illustrating a structure of a UE, in accordance with a thirteenth embodiment of the application.

With reference to FIG. 16, FIG. 16 illustrates a structure of a UE, which includes a third processor 1602.

The third processor 1602 is adapted to control an execution of a third transceiver 1601, according to a program read from a third memory 1603. The third processor 1602 is further adapted to monitor a paging message under the LC state, initiate a connection establishment process when receiving the paging message, and enter connection state from the LC state.

In FIG. 16, bus structure may include any number of interconnected buses and bridges. Specifically, at least one processor demonstrated by the third processor 1602 connects with various circuits of a memory, which is demonstrated by the third memory 1603. In the bus structure, various other circuits may be connected, such as peripheral equipment, voltage regulator and power management circuit, which is common to those skilled in the art. Thus, no further description is provided here. A bus interface provides an interface. The third transceiver 1601 may be multiple components, that is, include a transmitter and a receiver, which provides a unit to communicate with various other devices via a transmission medium. For a different UE, a user interface 1604 may be an interface, which is external or internal to a device needing to be connected. The connected device may include, but is not limited to, keypad, monitor, speaker, microphone, joystick, and so on.

A Fourteenth Embodiment

Figure 17:
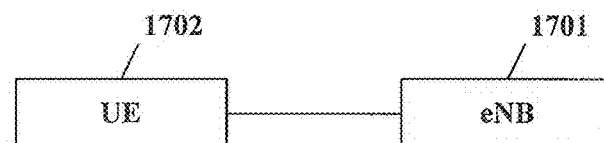
FIG. 17 is a schematic diagram illustrating a structure of a paging system, in accordance with a fourtheen embodiment of the application.

With reference to FIG. 17, FIG. 17 illustrates a structure of a paging system, which includes a first eNB 1701 and a UE 1702.

The first eNB 1701 is adapted to generate a paging ID for the UE, when receiving downlink data of the UE under the LC state.

The first eNB is further adapted to transmit a paging message within a paging area, according to the paging ID.

The UE 1702 is adapted to monitor the paging message under the LC state.

The UE 1702 is further adapted to initiate a connection establishment process, and enter connection state from LC state, when receiving the paging message under the LC state.

A Fifteenth Embodiment

Figure 18:
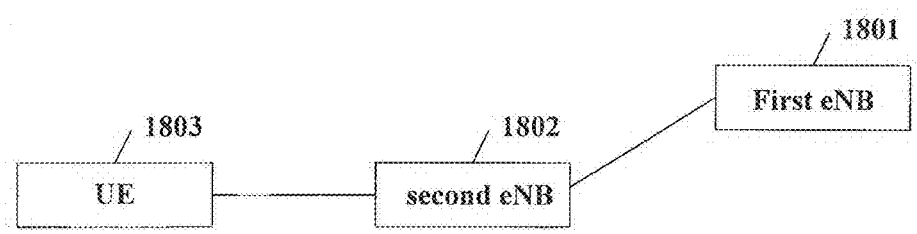
FIG. 18 is a schematic diagram illustrating a structure of a paging system, in accordance with a fifteenth embodiment of the application.

With reference to FIG. 18, FIG. 18 illustrates a structure of a paging system, including a first eNB 1801, a second eNB 1802 and a UE 1803.

The first eNB 1801 is adapted to generate a paging ID for the UE, when receiving downlink data of the UE under the LC state.

The first eNB 1801 is further adapted to transmit a paging message within a paging area, according to the paging ID.

The second eNB 1802 is adapted to receive from the first eNB the paging message, which is for use in paging the UE under the LC state.

The second eNB 1802 is further adapted to transmit the paging message within a cell under coverage.

The UE 1803 is adapted to monitor the paging message under the LC state.

The UE 1803 is further adapted to initiate a connection establishment process, and enter connection state from LC state, when receiving the paging message under the LC state.

In the embodiment, paging problems of a UE under an LC state may be solved, thereby reducing signaling overheads of the whole system, meanwhile guaranteeing system performance.

It should be understood that, "an embodiment" mentioned throughout the specification means as follows. A specific feature, structure or characteristic related with the embodiment is included by at least one embodiment of the application. Thus, "in an embodiment" throughout the whole specification does not necessarily refer to the same embodiment. In addition, these specific features, structures or characteristics may be combined into one or more embodiments in any appropriate manner.

In various embodiments of the application, it should be understood that, number sequence of each foregoing process does not mean order of execution. The order of execution of each process should be determined by function and internal logic thereof, instead of making any limitation to implementation process of embodiments in the application.

In addition, terms "system" and "network" in the application may be exchanged for use.

It should be understood that, the term "and/or" in the application only describes a relationship of associated objects, which denotes that three relationships may exist, e.g., A and/or B may demonstrate three scenes of: A exists independently, A and B exist simultaneously, B exists independently. In addition, the character "/" in the application generally refers to that, there is a "or" relationship between two adjacent associated objects.

In the embodiments provided by the application, it should be understood that, "B corresponds to A" refers to as follows. B is related with A, and B may be determined based on A. It should also be understood that, determining B based on A does not mean to determine B only based on A, B may be determined based on A and/or other information.

In several embodiments provided by the application, it should be understood that, the disclosed method and device may be implemented by other modes. For example, the above described device embodiments are merely schematic, e.g., the division of units is only a logic function division. When being implemented in practice, there may be other division modes. For example, multiple units or components may be combined to, or integrated into another system, or some features may be omitted, or may be not executed. From another point, the displayed or discussed mutual coupling or direct coupling, or communication connection may be implemented, by using some interfaces, an indirect coupling or communication connection between devices or units, which may be electrical, mechanical or otherwise.

In addition, each functional unit in various embodiments of the application may be integrated into one processing unit, or each unit may be an independent physical entity, still or, at least two units may be integrated into one unit. Foregoing integrated unit may be implemented in the form of hardware, or in the form of hardware and software functional units.

Foregoing integrated unit, which is implemented in the form of software functional units, may be stored into a computer readable storage medium. Foregoing software functional unit is stored in one storage medium, which includes several instructions. The several instructions are capable of enabling one computer device (which may be a personal computer, a server, or a network device, and so on) to perform some blocks of a transceiver method in various embodiments of the application. While foregoing storage medium may be various mediums capable of storing program codes, which include U-disk, mobile hard disk, Read-Only Memory (ROM), Random Access Memory (RAM), disk, or Compact Disk (CD).

The foregoing is optional implementation modes of the application. It should be noted that, for persons having ordinary skill in the art, various improvements and retouches, which are made without departing from the principle of the application, should be covered by the application.

What is claimed is:

1. A paging method, comprising:
receiving, by a second evolved Node B (eNB) through an X2 interface, from a first eNB a paging message, to page a User Equipment (UE) in a Light Connection (LC) State, wherein the paging message is transmitted and generated by the first eNB within a paging area, after the first eNB receives downlink data for the UE in the LC state and triggers paging; and
transmitting, by the second eNB, the paging message within the second eNB cell coverage;
wherein the method further includes:
establishing, by the second eNB, a Radio Resource Control (RRC) connection to the UE;
discarding, by the second eNB, a paging related Non-Access-Stratum (NAS) message carried by the RRC connection establishment process; and
informing, by the second eNB, to the first eNB, a message that the RRC connection has been established with the UE.

2. The method according to claim 1, further comprising:
receiving, by the second eNB, the downlink data from the first eNB; and
transmitting, by the second eNB, the downlink data to the UE.

3. The method according to claim 1, further comprising:
broadcasting, by the second eNB, paging parameters of the UE under the LC state, by using system information.

4. An evolved Node B (eNB) for implementing the method according to claim 1, comprising a paging message receiving module and a second paging message transmitting module, wherein
the paging message receiving module is configured to receive from a first eNB a paging message of a User Equipment (UE) in a Light Connection (LC) state through an X2 interface, wherein the paging message is transmitted by the first eNB within a paging area, after receiving downlink data for the UE in the LC state; and
the second paging message transmitting module is configured to transmit the paging message within the eNB cell coverage;
wherein the eNB further includes a second connection establishing module and an informing module, and
wherein the second connection establishing module is configured to establish a Radio Resource Control (RRC) connection to the UE, and discard a paging related Non-Access-Stratum (NAS) message carried by the RRC connection establishment process; and
the informing module is configured to inform the first eNB by sending a message that the RRC connection has been established with the UE.

5. An evolved Node B (eNB) for implementing the method according to claim 1, comprising a processor and a transceiver, wherein
the processor is configured to control the transceiver to receive from a first eNB, a paging message through an X2 interface, for paging a User Equipment (UE) in a Light Connection (LC) state, wherein the paging message is transmitted by the first eNB within a paging area, after the first eNB receives downlink data of the UE under the LC state; and
the transceiver is configured to transmit the paging message in the eNB cell coverage;
wherein the processor is configured to,
establish a Radio Resource Control (RRC) connection to the UE;
discard a paging related Non-Access-Stratum (NAS) message carried by the RRC connection establishment process; and
inform the first eNB by sending a message that the RRC connection has been established with the UE.

6. The eNB according to claim 4, further comprising a downlink data receiving module and a second data transmitting module, wherein
the downlink data receiving module is configured to receive the downlink data from the first eNB; and,
the second data transmitting module is configured to transmit the downlink data to the UE.

7. The eNB according to claim 4, further comprising a second broadcasting module, wherein the second broadcasting module is configured to broadcast paging parameters of the UE under the LC state, by using system information.

* * * * *